Patented Dec. 3, 1929

1,738,064

UNITED STATES PATENT OFFICE

TAKANOSHIN DOMOTO, OF OAKLAND, CALIFORNIA

PROCESS OF CANNING ABALONE

No Drawing.   Application filed August 25, 1928.   Serial No. 302,143.

This invention relates to the process of canning abalone, whereby it is rendered wholesome, free of germs, and in edible state upon being removed from the containers.

The particular method employed by me, will be first clearly described in connection with all that is necessary for a full understanding thereof, and subsequently pointed out in the claims.

In canning abalone, it has been heretofore difficult to render them uniformly tender and in such a state that upon being removed from the container they would present an attractive appearance to the consumer. The old method was to remove the abalone from its shell, cut it into chunks, place the whole in a container with a desired amount of water, and subject them to steam pressure for a predetermined period, however, this method proved entirely unsatisfactory for the reason that the meat was not cooked uniformly, being of different sized pieces, the large pieces requiring a longer cooking period than the smaller, with the obvious result that many of the smaller pieces were overdone and the rare flavor lost. On the other hand, it has been found that some of the larger pieces were raw or but partly cooked in and about their centers, and consequently the germs were still present, causing spoiling of the meat after the can was sealed.

Also, the older method was a costly one, since it required fifteen (15) pounds of steam over an hour to kill the germs, and oftentimes longer, depending upon whether the pieces were uniformly cut. By my method, the uniformity of cooking the meat and killing of germs is insured, and a great saving of fuel and time is effected, since it requires only fifteen (15) pounds of steam for a period of one-half hour to completely sterilize and cook the meat.

My method consists of slicing the fresh abalone down to what may be termed its "heel" or "sole", across the grain and leaving each slice joined by the mere thickness of the "heel". Such slicing permits the heat to permeate each and every part of the meat, whereby the same is uniformly cooked and the germs are wholly destroyed.

The cooking process can assume any one of the various systems now in use, and it will be noted that the primary and principal step in my process is the slicing of the abalone. When the abalone has been sliced according to the aforementioned description, it stands fanlike in shape. Upon removing each individual abalone from the can, the consumer in preparing the same for consumption, simply makes a horizontal cut in the abalone just at the top of the heel, from one end to the other, at the end of the cross-grained slices previously described. In this manner the meat may be served in uniform style and present an especially neat and appetizing appearance, in addition to having all of its natural flavor preserved.

This product while not marketed a great deal in this country, is a popular item of food with the orientals, and one of the chief difficulties as hereinbefore stated has been the presenting of the abalone meat in such a manner as it may be readily served and its wholesomeness assured. Abalone is noted as being one of the toughest meats there is, and is likewise notoriously hard to cook.

What I claim is:—

The process of canning abalone, consisting in slicing the abalone transversely from the top down to the "heel" thereof, with the "heel" remaining intact, to form a multiplicity of uniformly thin slices connected by the unsevered "heel" of the abalone, placing the abalone so treated in cans, and subjecting the material so contained to steam pressure to sterilize and cook the same.

TAKANOSHIN DOMOTO.